United States Patent [19]
Tani et al.

[11] Patent Number: 5,497,468
[45] Date of Patent: Mar. 5, 1996

[54] DATA PROCESSOR THAT UTILIZES FULL DATA WIDTH WHEN PROCESSING A STRING OPERATION

[75] Inventors: Kunio Tani; Toyohiko Yoshida; Yukari Takata, all of Itami, Japan

[73] Assignee: Mitsubishi Denki Kabushiki Kaisha, Tokyo, Japan

[21] Appl. No.: 327,823

[22] Filed: Oct. 20, 1994

Related U.S. Application Data

[63] Continuation of Ser. No. 752,420, Aug. 29, 1991, abandoned.

[30] Foreign Application Priority Data

Aug. 29, 1990 [JP] Japan ................... 2-231964

[51] Int. Cl.⁶ ................ G06F 7/66; G06F 7/20; G06F 7/38; G06F 9/00
[52] U.S. Cl. ............... 395/375; 364/259.2; 364/262.8; 364/262.81; 364/259.9; 364/DIG. 1
[58] Field of Search ........................................... 395/375

[56] References Cited

U.S. PATENT DOCUMENTS

| | | | |
|---|---|---|---|
| 4,463,421 | 7/1984 | Louis | 395/325 |
| 4,604,695 | 8/1986 | Widen et al. | 395/400 |
| 4,785,393 | 11/1988 | Chu et al. | 395/375 |
| 5,060,143 | 10/1991 | Lee | 395/600 |
| 5,193,167 | 3/1993 | Sites et al. | 395/425 |

OTHER PUBLICATIONS

1486 Microprocessor Programmer's Reference Manual, Intel Corporation.

*Primary Examiner*—Kevin J. Teska
*Assistant Examiner*—Ayni Mohamed
*Attorney, Agent, or Firm*—Townsend and Townsend and Crew

[57] ABSTRACT

A data processor which performs in parallel a comparison process of n (which is an integer 2 or more)—sets first size data a elements by logical add operation between data elements in executing a first instruction for processing simultaneously number of n first size data elements, and performs a comparison process of one-set second size data elements by logical product operation of the compared results of whole data elements in executing a second instruction for processing individually second size data elements whose size is n times of said first size.

3 Claims, 18 Drawing Sheets

Fig. 1(a)

| 0 | 0 | e | e | e | e | s | x | 1 | 1 | 1 | 0 | P | 1 | Q | b |

Fig. 1(b)

| 0 | 0 | e | e | e | e | s | x | 1 | 1 | 1 | 0 | P | 0 | Q | b |

Fig. 2

| TERMINATION-SEARCH CONDITION=CONDITION | MNEMONIC OF OPTION | BIT PATTERN |
|---|---|---|
| > COMPARED VALUE OF INDEX CONDITION | LTE less than(unsigned) | 0000 |
| ≥ COMPARED VALUE OF INDEX CONDITION | GEU greater or equal(unsigned) | 0001 |
| = COMPARED VALUE OF INDEX CONDITION | EQ equal | 0010 |
| ≠ COMPARED VALUE OF INDEX CONDITION | NE not equal | 0011 |
| < COMPARED VALUE OF INDEX CONDITION | LT less than(signed) | 0100 |
| ≥ COMPARED VALUE OF INDEX CONDITION | GE greater or equal(signed) | 0110 |
| NO TERMINATION CONDITION | N never | 0111 |

Fig. 5

| MICROFIELD | OPERATION | FUNCTION |
|---|---|---|
| SU | u | ZERO EXTENSION |
|  | s | SIGN EXTENSION |
| AOP | + | ADD (A + B) |
|  | − | SUBTRACT (A − B) |
|  | ─ | SUBTRACT (A − B) |
|  | & | LOGICAL PRODUCT (A AND B) |
|  | \| | LOGICAL ADD (A OR B) |
|  | * | COMPARE |
| DA | S1 | INPUT FROM S1 BUS, OUTPUT TO ALU DIRECTLY |
|  | S1# | INPUT FROM S1 BUS, OUTPUT TO ALU WITH REVERSING |
|  | 0 | CLEAR ALU REGISTER A |
|  | DA | NOT INPUT |
| DB | S2 | INPUT FROM S2 BUS, OUTPUT TO ALU DIRECTLY |
|  | S2# | INPUT FROM S2 BUS, OUTPUT TO ALU WITH REVERSING |
|  | 0 | CLEAR ALU REGISTER B |
|  | DB | NOT INPUT |
| ZA | w | WORD |
|  | h | HALF WORD |
|  | b | BYTE |
| ZB | w | WORD |
|  | h | HALF WORD |
|  | b | BYTE |
| ADO | breg | RETURN OPERATION RESULT TO ALU REGISTER B |
|  | sreg | OUTPUT CONTENT OF S REGISTER TO DO BUS |
|  | ADO | NOT OUTPUT TO DO BUS FROM ALU |

Fig. 6

| ALU OPERATION | A D P | B A | B A | A D P |
|---|---|---|---|---|
| S1 + S2 ≥ do | + | S 1 | S 2 | sreg |
| S1 + breg ≥ do | + | S 1 | D B | sreg |
| areg + S2 ≥ do | + | D A | S 2 | sreg |
| S1 − S2 | − | S 1 | S 2 | ADO |
| S1 − S2 ≥ do | − | S 1 | S 2 | sreg |
| S1 − 0 | − | S 1 | 0 | ADO |
| 0 − breg | − | 0 | D B | ADO |
| S2 − S1 | -- | S 1 | S 2 | ADO |
| S2 − S1 ≥ do | -- | S 1 | S 2 | sreg |
| S2 − areg | -- | D A | S 2 | ADO |
| S2 − areg ≥ do | -- | D A | S 2 | sreg |
| breg − S1 | -- | S 1 | D B | ADO |
| 0 − S1 | -- | S 1 | 0 | ADO |
| 0 − S1 ≥ do | -- | S 1 | 0 | sreg |
| S1 & S2 ≥ do | & | S 1 | S 2 | sreg |
| S1 & breg ≥ do | & | S 1 | D B | sreg |
| S1# & S2 ≥ do | & | S 1 # | S 2 | sreg |
| S1# & S2 ≥ breg | & | S 1 # | S 2 | breg |
| areg & S2 ≥ do | & | D A | S 2 | sreg |
| areg & S2# ≥ do | & | D A | S 2 # | sreg |
| S1 \| S2 ≥ do | \| | S 1 | S 2 | sreg |
| S1 \| S2 ≥ breg | \| | S 1 | S 2 | breg |
| S1 \| breg ≥ do | \| | S 1 | D B | sreg |
| areg \| S2 ≥ do | \| | D A | S 2 | sreg |
| S1    ≥ do | \| | S 1 | 0 | sreg |
| S1#   ≥ do | \| | S 1 # | 0 | sreg |
| S2    ≥ do | \| | 0 | S 2 | sreg |
| areg  ≥ do | \| | D A | 0 | sreg |
| breg  ≥ do | \| | 0 | D B | sreg |
| S1 ¥ S2 | ¥ | S 1 | S 2 | ADO |

Fig. 9(a)

| | 0 | 7 8 | 15 16 | 23 24 | 31 |
|---|---|---|---|---|---|
| 94 — COUNT VALUE UPDATING VALUE OF DECREMENTER 20 | | "1" | "2" | "3" | "4" |
| 95 — COUNT VALUE UPDATING VALUES OF ADDRESS COUNTERS 13,14 | | "1" | "2" | "3" | "4" |
| 96 — DATA WIDTH (BYTE) OUTPUTTED TO ALIGNMENT CIRCUIT 24 | 1 BYTE | 2 BYTE | 3 BYTE | 4 BYTE | |

↕ SOURCE DATA A (0:31)
← COMPARED DATA SIZE : 1 BYTE →

Fig. 9(b)

| | 0 | 15 16 | 31 |
|---|---|---|---|
| 94 — COUNT VALUE UPDATING VALUE OF DECREMENTER 20 | | "1" | "2" |
| 95 — COUNT VALUE UPDATING VALUES OF ADDRESS COUNTERS 13,14 | | "2" | "4" |
| 96 — DATA WIDTH (BYTE) OUTPUTTED TO ALIGNMENT CIRCUIT 24 | 2 BYTE | 4 BYTE | |

↕ SOURCE DATA A (0:31)
← COMPARED DATA SIZE : 2 BYTE →

Fig. 9(c)

| | 0 | 31 |
|---|---|---|
| 94 — COUNT VALUE UPDATING VALUE OF DECREMENTER 20 | | "1" |
| 95 — COUNT VALUE UPDATING VALUES OF ADDRESS COUNTERS 13,14 | | "4" |
| 96 — DATA WIDTH (BYTE) OUTPUTTED TO ALIGNMENT CIRCUIT 24 | 4 BYTE | |

↕ SOURCE DATA A (0:31)
← COMPARED DATA SIZE : 4 BYTE →

Fig. 10(a)

| | 0 | 7 8 | 15 16 | 23 24 | 31 |
|---|---|---|---|---|---|
| 98 VALUE SETTING COMPARED RESULT OF 1st SOURCE DATA AND COMPARED VALUE TO COMPARED RESULT HOLDING REGISTER 29 | | 1 | 2 | 3 | 4 |
| 94 COUNT VALUE UPDATING VALUE OF DECREMENTER 20 | | 1 | 2 | 3 | 4 |
| 95 COUNT VALUE UPDATING VALUES OF ADDRESS COUNTERS 13, 14 | | 1 | 2 | 3 | 4 |

← SOURCE DATA A (0:31) →
← COMPARED DATA SIZE : 1 BYTE →

Fig. 10(b)

| | 0 | 15 16 | 31 |
|---|---|---|---|
| 98 VALUE SETTING COMPARED RESULT OF 1st SOURCE DATA AND COMPARED VALUE TO COMPARED RESULT HOLDING REGISTER 29 | | 1 | 2 |
| 94 COUNT VALUE UPDATING VALUE OF DECREMENTER 20 | | 1 | 2 |
| 95 COUNT VALUE UPDATING VALUES OF ADDRESS COUNTERS 13, 14 | | 2 | 4 |

← SOURCE DATA A (0:31) →
← COMPARED DATA SIZE : 2 BYTE →

Fig. 10(c)

| | 0 | 31 |
|---|---|---|
| 98 VALUE SETTING COMPARED RESULT OF 1st SOURCE DATA AND COMPARED VALUE TO COMPARED RESULT HOLDING REGISTER 29 | | 1 |
| 94 COUNT VALUE UPDATING VALUE OF DECREMENTER 20 | | 1 |
| 95 COUNT VALUE UPDATING VALUES OF ADDRESS COUNTERS 13, 14 | | 4 |

← SOURCE DATA A (0:31) →
← COMPARED DATA SIZE : 4 BYTE →

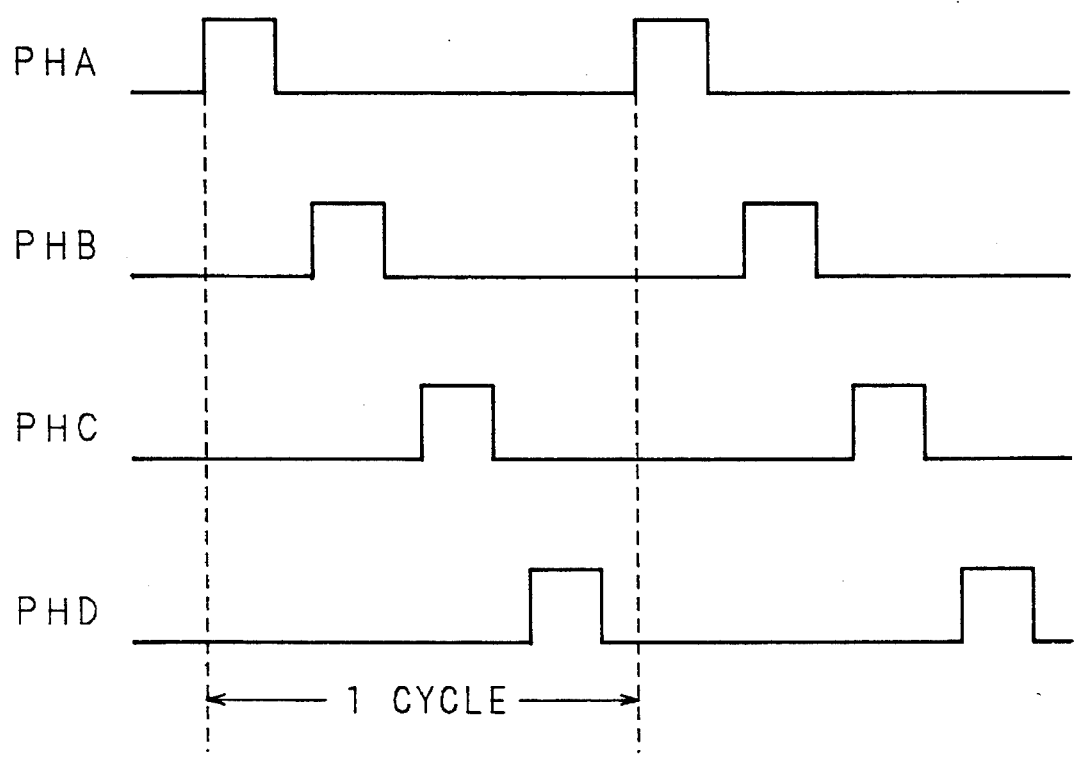

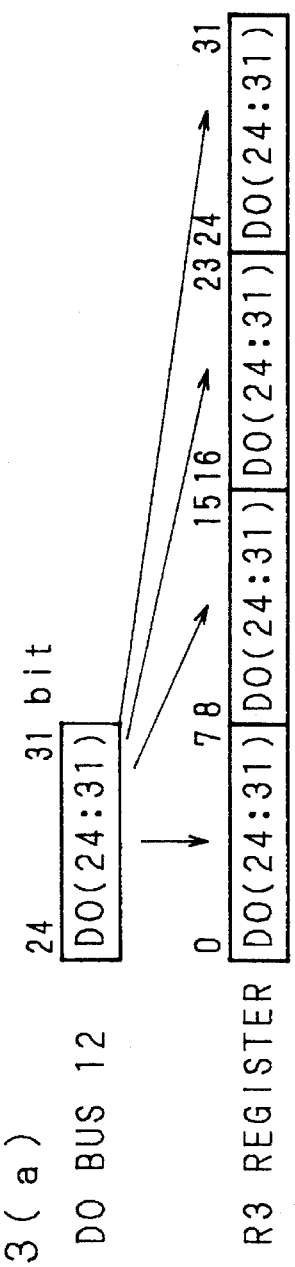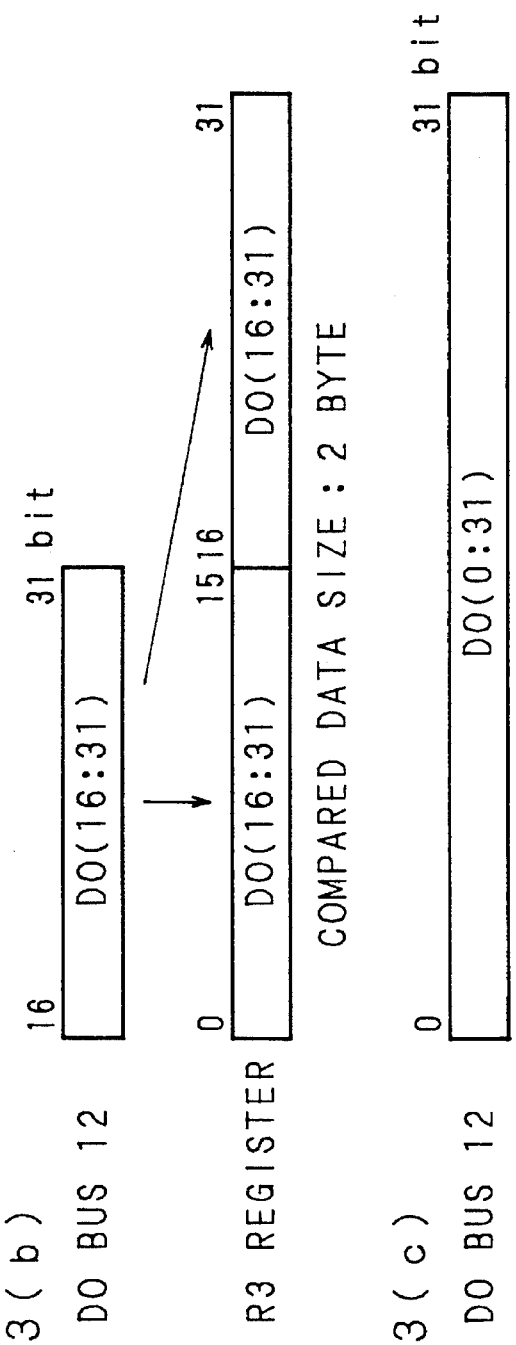

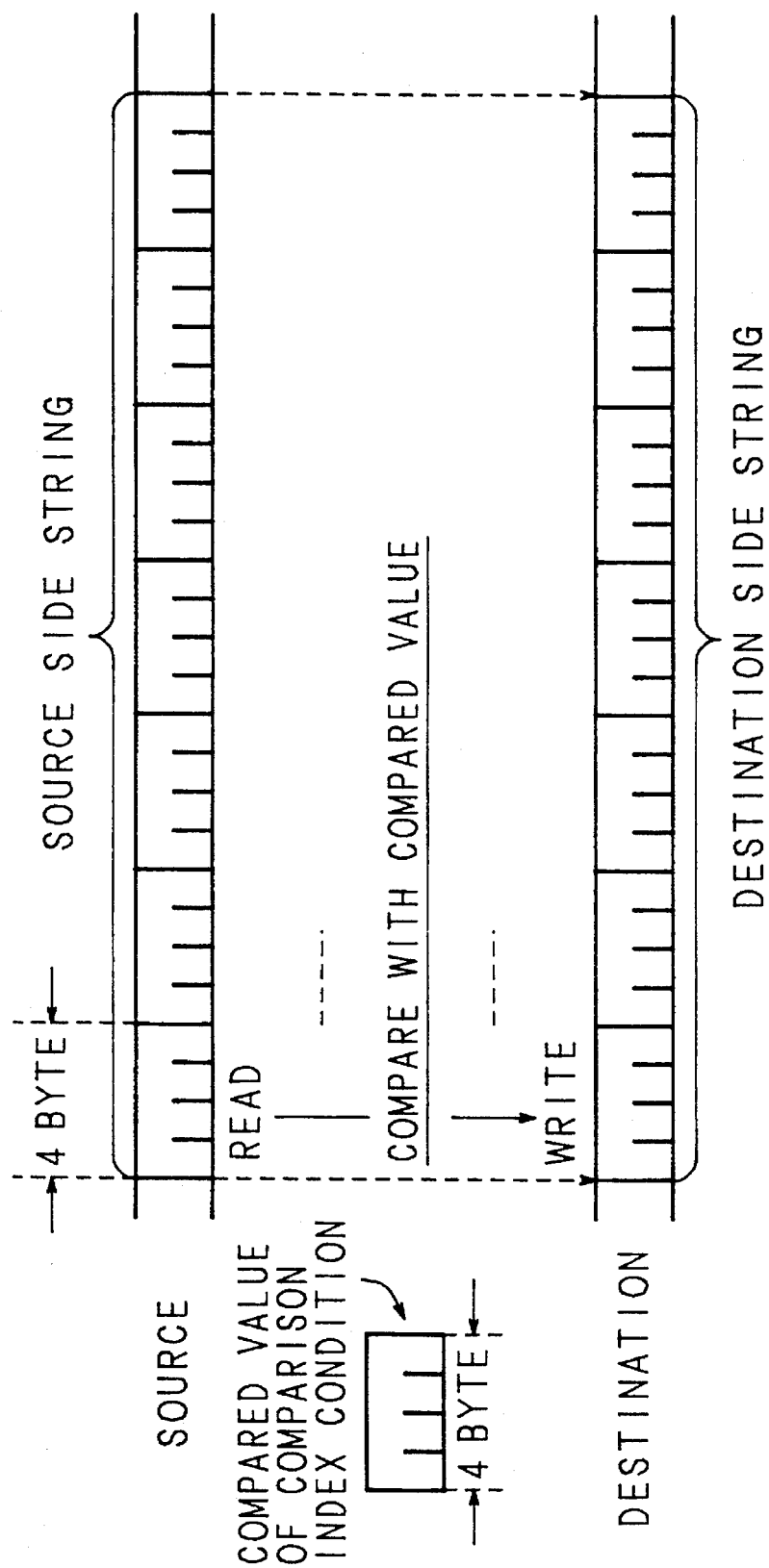

Fig. 16

R0 REGISTER | START ADDRESS OF 1st SOURCE SIDE STRING (SOURCE ADDRESS)

R1 REGISTER | START ADDRESS OF 2nd SOURCE SIDE STRING (SOURCE ADDRESS)

R2 REGISTER | ELEMENT NUMBERS INDICATING STRING LENGTH

R3 REGISTER | COMPARED VALUE OF COMPARISON INDEX CONDITION

DATA PROCESSOR THAT UTILIZES FULL DATA WIDTH WHEN PROCESSING A STRING OPERATION

This is a Continuation of application Ser. No. 07/752,420, filed Aug. 29, 1991, now abandoned.

BACKGROUND OF THE INVENTION

1. Field of the Invention

The present invention relates to a data processor and more particularly to a data processor capable of executing string operation at a high speed.

2. Description of the Related Art

Generally, data processors such as microprocessors perform processings such as a transfer, comparison and search of data (hereinafter called string) in which only the arbitrary number of 8-bit, 16-bit or 32-bit data (hereinafter each data called element) is linearly and sequentially arranged. In the case where such processings are performed by conventional data processors, the transfer, comparison and search of a string with an arbitrary length have been executed by repeating of transfer, comparison and search in element units by the number of times according to string length.

An example of conventional microprocessors performing such string transfer is described, for example, in detail in the section 3.6 of "i486TM PROCESSOR PROGRAMMER'S REFERENCE MANUAL 1990" of Intel Corporation.

In the case where the transfer, comparison and search in element units are performed by data processors such as conventional microprocessors, the data in element units to be operated have been compared with the comparison value specifying instruction termination by an arithmetic unit to detect instruction termination condition. However, in the case where the size of an element is 8 bits and 16 bits, a problem has existed in that, for example, when an arithmetic unit with 32-bit width is used, the remaining 24-bit and 16-bit have not been used for comparison, thereby not making processing speed higher in executing the instructions for performing the transfer, comparison and search of strings.

SUMMARY OF THE INVENTION

The present invention solves the above described problems by providing a data processor including a logic circuit to perform comparisons in parallel when a comparison string element is less than the full word width to increase the execution speed for string transfer, comparison, and search instructions.

According to one aspect of the invention a data processor includes an ALU, data paths, and registers for processing in parallel data words comprising a plurality, equal to an integer n, of data elements. A string processing instruction executed by the processor includes a size field specifying the number of data elements included in string comparison elements that are to be compared when processing the instruction. The string comparison element may comprise either the entire data word or a fraction thereof.

The data processor includes an instruction decoder for decoding an instruction, first and second registers for holding data words including string comparison elements to be compared, and a logic circuit coupled to said registers for comparing, in parallel, each data element held in said first register with a corresponding data element held in said second register and outputting a compared result for each comparison indicating whether the compared data elements satisfy a comparison condition. Thus, as the result of the parallel comparison of the data elements in the logic circuit, n compared results are output from the logic circuit.

The compared results from the logic circuit are provided to a compared result judging circuit, coupled to the instruction decoder and logic circuit, which performs logical operations on the compared results. The particular logical operations depend on the number of data elements specified by the size field. If a single data element is specified then the compared result judging circuit performs a logical add operation on the compared results to determine whether any of the string comparison elements, which in this case comprise a single data element, compared in parallel satisfy the comparison condition. If the string comparison element is one-half of the data word then the logical product operation of the compared results corresponding to the data elements of the first half of the data words and the logical product operation of the compared results corresponding to the data elements forming the second half of the data words are performed. The logical add operation of the products is then performed to indicate whether either of the string comparison elements satisfy the comparison condition. Finally, if the string comparison element is equal to the entire data word then the logical product operation on all the compared results is performed to indicate whether the string comparison elements satisfy the comparison condition.

According to a second aspect of the invention for executing a string transfer instruction that includes a size field specifying the number of data elements in a string comparison element, a data processor coupled to an external memory comprises an instruction decoder for decoding the string transfer instruction, an address register, connected with the instruction decoder, for holding the start address of a string in memory which is to be transferred, a data input/output circuit for transferring a word from memory, comprising n data elements, to a first register, a second register for holding copies of a comparison value, where each copy of the comparison value comprises the number of data elements specified by the size field. The number of copies of the comparison value held in the second register depends on the size of the comparison value.

The transfer operation is completed when a string comparison element transferred to the first register and the comparison value satisfy a comparison condition. If the comparison value comprises a single data element, then n copies of the comparison value are held in the second register. The logic circuit then performs n comparisons in parallel and the judging circuit indicates whether any data element in the first register and the comparison value satisfy a comparison condition. The transfer operation is repeated word by word until satisfaction of the comparison condition is detected.

According to a third aspect of the invention for executing a string comparison instruction that includes a size field specifying the number of data elements in a string comparison element, a data processor coupled to an external memory comprises an instruction decoder for decoding the string comparison instruction, a decrementer register for holding a length field specifying the number of data elements in a string to be processed, a first address register, connected with the instruction decoder, for holding the start address of a string in memory which is to be compared, a second address register, connected with the instruction decoder, for holding the start address of a second string in memory which is to be compared, a data input/output circuit for transferring words from memory, comprising n data elements, to a first register and a second register, and a third register for holding copies of a comparison value, where each copy of the comparison value comprises the number of data elements specified by the size field. The number of copies of the comparison value held in the third register depends on the size of the comparison value.

According to this aspect of the invention the logic circuit first performs the comparison between the data elements of the first register and data elements forming the comparison values held in the third register to output a first set of compared results and then performs a comparison between the data elements held in the first and second registers to output a second set of compared results. The judging circuit performs logical operations on each set of compared results to determine whether the first string comparison elements and the comparison value or the first and second string comparison elements satisfy the comparison condition. Depending on the results of the logical operation performed the execution of the string comparison instruction is terminated or continued. If the execution is continued the value of the length field held in the decrementer is decreased by n.

Additionally, the logical sum of the output of the decrementer is formed if the decrementer signal is less than n. If this sum is zero then the execution of the instruction is terminated.

The above and Further objects and features of the invention will more Fully be apparent from the Following detailed description with accompanying drawings.

BRIEF DESCRIPTION OF THE DRAWINGS

FIG. 1(a) is a typical view showing the operation code of the SMOV instruction,

FIG. 1(b) is a typical view showing the operation code of the SCMP instruction,

FIG. 2 is a typical view showing a comparison condition specifiable by the SMOV instruction and the SCMP instruction, and the bit pattern thereof, FIG. 5 is a typical view showing the definition contents of the operations specifiable by each microfield related to an ALU control, FIG. 6 is a list view showing the definition contents of the functions of the ALU, FIGS. 9(a)–9(c) are a typical view showing the value of each count value specifying register set by the string compared result judging circuit provided in the data processor of the present invention and the value of the data size outputted to the alignment circuit provided in the data processor, FIGS. 10(a)–10(c) are a typical view showing the value of each count value specifying register set by the string compared result judging circuit provided in the data processor of the present invention and the value of the compared result output, ted to a register for holding the compared result between a first source data and a comparison value, FIG. 11 is a timing chart showing the timing of an internal clock in the data processor of the present invention, FIGS. 13(a)–13(c) are a typical view to explain the operation of an R3 register in storing data from a DO bus to the R3 register at the time of the SMOV instruction and an SCMP instruction executing, FIG. 14 is a typical view to explain the operation of the SMOV instruction, FIG. 16 is a typical view showing the operand of the SCMP instruction.

DESCRIPTION OF THE PREFERRED EMBODIMENTS

Figure 3:
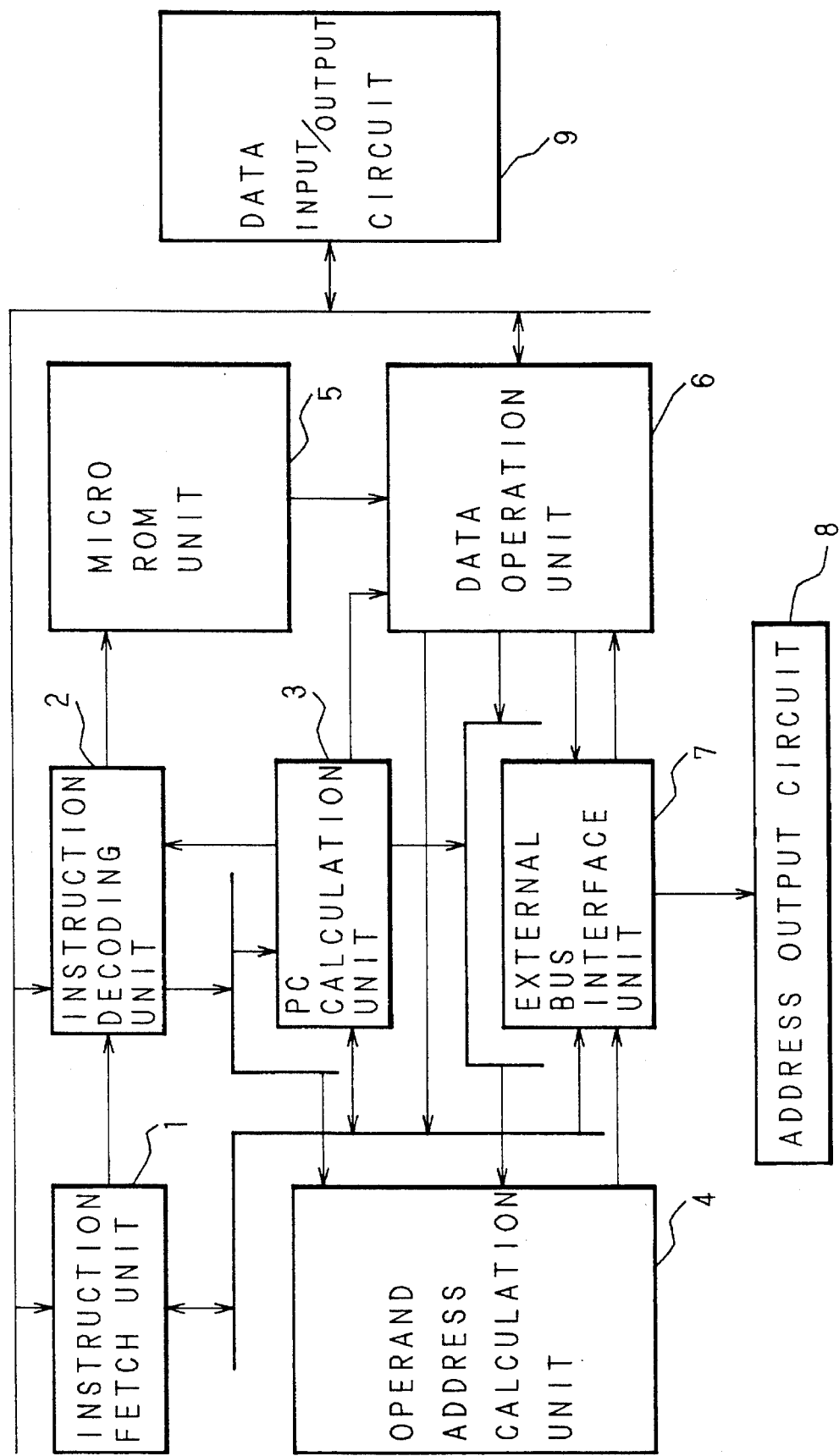
FIG. 3 is a block diagram showing the configuration of a data processor of the present invention.

With reference to drawings showing embodiments, the present invention will be explained hereinafter.

(1) "Explanation of string instruction"

A data processor of the present invention can execute the instructions of data transfer or arithmetic operation, data shift, and logical operation, as well as four-kind instructions called string operation instructions.

String is a type of data in which only the arbitrary number of 8-bit, 16-bit or 32-bit data is linearly and sequentially arranged. String operating instructions includes an SMOV instruction to transfer strings, an SCMP instruction ho compare strings, an SSCH instruction to search strings for an element satisfying specific conditions, and an SSTR instruction to write repeatedly a prespecified value as a factor of strings.

Those instructions process character strings in which each one character is represented by 8-, 16- or 32-bit data, and are also used to search specific bit pattern, block transfer of memory, assignment of structure, and clearing memory area. The method of indicating the scope of a string to be operated includes the following two methods:

Method of specifying the length of the string (number of elements)

Method of specifying the character (terminator) indicating the termination of the string In the data processor of the present invention, when string operation is performed, the number of elements becomes a parameter, and the terminator or instruction termination condition can be given in the Form of index condition. As the index condition of string instruction, a variety of index conditions including large/small comparison and two-value comparison are specifiable configured. Of those string instructions, the SMOV instruction, the SCMP instruction and the SSCH instruction are used to check for index condition in such a manner that, each time a single operation of transfer, comparison and search is terminated for the specific number of elements, element values are compared with a comparison value on all elements to be operated at the next step. In the case where the index condition is not established For all the elements, only the specific number of elements is transferred, compared and searched.

Taking as examples the SMOV instruction and the SCMP instruction of the above-mentioned Four instructions, the processing method thereof will be explained hereinafter. A case where two-value comparison is specified as an index condition of string instruction will also be explained.

FIG. 1(a) and FIG. 1(b) are typical views representing the operation code of the SMOV instruction and the SCMP instruction, respectively.

In FIG. 1(a) and FIG. 1(b), 2 bits indicated with "sx" specifies the element size and the size of the comparison value of index condition in a manner to specify 8 bits when "sx"="00" 16 bits when "sx"="01" and 32 bits when "sx"="10".

One bit indicated with "b" specifies the advancing of the processing of string operation in the address increase direction when "b"="0" and in the address decrease direction when "b"="1".

Further, 4 bits indicated with "eeee" specifies a specifiable comparison index condition. The specifiable condition by the 4 bits of the "eeee" and the bit pattern thereof are shown in FIG. 2.

The conditions specifiable by each bit pattern are large/small relationship, equal/unequal relationship and no condition.

(2) "Configuration of Function Block"

FIG. 3 is a block diagram showing a configuration of the microprocessor of the present invention.

The interior of the microprocessor of the present invention is functionally divided roughly into an instruction fetch unit 1, an instruction decoding unit 2, a PC calculation unit 3, an operand address calculation unit 4, a micro ROM unit 5, a data operation unit 6 and an external bus interface unit 7.

In FIG. 3, in addition to the above-described units, an address output circuit 8 for outputting address to the exterior of a CPU, and a data input/output circuit 9 for inputting and outputting data from and to the exterior of the CPU are shown being separated from the other function block units.

(2.1) "Instruction Fetch Unit"

The instruction fetch unit 1 which comprises an instruction cache, an instruction queue and a controlling unit thereof, determines the address of an instruction to be fetched next and fetches the instruction from the instruction cache or a memory outside the CPU. It also performs instruction registering to the instruction cache.

The address of an instruction to be fetched next is calculated by a dedicated counter as the address of the instruction to be inputted to an instruction queue. In the case where a branch or jump is generated, an address of a new instruction is transferred from the PC calculation unit 3 or the data operation unit 6.

In the case where an instruction is fetched from a memory outside the CPU, the address of the instruction to be fetched is outputted from the address output circuit 8 to the outside of the CPU through the external bus interface unit 7, and an instruction code is fetched from the data input/output circuit 9.

Then, among the instruction codes in buffering, the instruction code to be decoded next is outputted to the instruction decoding unit 2.

(2.2) "Instruction Decoding Unit"

In the instruction decoding unit 2, basically an instruction code is decoded on a 16-bit (half word) basis. The instruction decoding unit 2 comprises a FHW (First Half Word) decoder for decoding an operation code included in the First half word, a NFHW (Not First Half Word) decoder for decoding an operation code including in the second and the third half words, and an addressing mode decoder for decoding an addressing mode. These FHW decoder, NFHW decoder and addressing mode decoder are generally called the first stage decoder.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 2 decodes the instruction code being inputted from the instruction fetch unit 1 by 0 bytes through 6 bytes per two clocks. Among the results of decoding, information on operation in the data operation unit 6 is outputted to the micro ROM unit 5, information on operand address calculation is outputted to the operand address calculation unit 4, and information on PC calculation is outputted to the PC calculation unit 3, respectively.

(2.3) "Micro ROM Unit"

The micro ROM unit 5 comprises a micro ROM for storing various microprograms which mainly controls the data operation unit 6, a micro sequencer, and a micro instruction decoder.

A micro instruction is read out from the micro ROM once per two clocks. The micro sequencer accepts processings of exception, interruption and trap (these three are generally called EIT) in a hardware manner in addition to the sequential processings shown by the microprograms. The micro ROM unit 5 also controls a store buffer. To the micro ROM unit 5, there are inputted flag information generated by interruption independent of the instruction code or by the result of operation execution, and output of an instruction decoding unit 2 such as output of a second stage decoder.

Output of the micro decoder is mainly given to the data operation unit 6, but some information such as information of stopping other preceding processing due to execution of a jump instruction is outputted also to other blocks.

(2.4) "Operand Address Calculation Unit"

The operand address calculation unit 4 is controlled in a hardwired manner by information on operand address calculation outputted from the address decoder of the instruction decoding unit 2 or the like.

In this operand address calculation unit 4, substantially all processing on operand address calculations is performed. Checking is conducted to determined whether or not the address of memory access for memory indirect addressing and the operand address can be within an I/O area mapped in the memory.

The result of address calculation by the operand address calculating unit 4 is sent to the external bus interface unit 7. The values of the general-purpose register and the program counter required for address calculation are inputted from the data operation unit 6.

In performing the memory indirect addressing, the memory address to be referred is outputted from the address output circuit 8 to the outside of the CPU through the external bus interface unit 7, and the indirect address value inputted from the data input/output unit 9 is fetched through the instruction decoding unit 2.

(2.5) "PC Calculation Unit"

The PC calculation unit 3 is controlled in a hardwired manner using information on PC calculation outputted from the instruction decoding unit 2. The PC calculation unit 3 calculates the PC value of an instruction.

The data processor of the present invention has a variable-length instruction set, and the length of that instruction can be found only after the instruction is decoded. For this reason, the PC calculation unit 3 generates the PC value of the next instruction by adding the length of the instruction outputted from the instruction decoding unit 2 to the PC value of the instruction in decoding. Also, in the case where the instruction decoding unit 2 instructs branching at the decoding stage by decoding a branch instruction, the PC value of the target instruction is calculated by adding a branch displacement to the PC value of the branch instruction instead of a instruction length.

In the data processor of the present invention, the technique that branching is executed at instruction decoding stage for the branch instruction is so called the prebranch.

The technique of prebranch is detailed described in Japanese Patent Applications Laid-Open No. 63-59630 and No. 63-55639.

The result of calculation in the PC calculation unit 3 is outputted as the PC value of each instruction together with the result of decoding of the instruction, also is outputted as the address of the instruction to be decoded next, to the instruction fetch unit 1 at pre-branching, and is more used as the address for branch prediction of the instruction which is decoded next at the instruction decoding unit 2.

The technique of branch prediction is detailed described in Japanese Patent Application Laid-Open No. 63-175934.

(2.6) "Data Operation Unit"

The data operation unit 6 is controlled by microprograms, and executes the operation required for realizing the function of each instruction by means of register file and an arithmetic unit according to microinstructions of the output of the micro ROM unit 5.

In the case where the operand to be operated by an instruction is an address or an immediate, the address or the immediate calculated in the operand address calculation unit 4 is obtained by passing it through the external bus interface unit 7 to the data operation unit 6. In the case where the operand to be operated on is in a memory outside the CPU, the external bus interface unit 7 outputs the address calculated in the address calculation unit 4 from the address output circuit 8, and the operand fetched from the memory outside the CPU is obtained through the data input/output circuit 9.

Arithmetic units include an ALU, a barrel shifter, a priority encoder, a counter, and a shift register are provided in the data operation unit 6. The register file and the main arithmetic units are connected through three buses, and one micro instruction for directing operation between registers is processed in two clock cycles.

In the case where an access to the memory outside the CPU is required at the data operation, the address is outputted from the address output circuit 8 to the outside of the CPU through the external bus interface unit 7 under the control of the microprogram, and the target data is fetched through the data input/output circuit 9.

In the case where data is stored in the memory outside the CPU, the address is outputted from the address output circuit 8 through the external bus interface unit 7, and simultaneously the data is outputted from the data input/output circuit 9 to the outside of the CPU.

In order to efficiently perform an operand store, a four-byte store buffer is installed in the data operation unit 6.

In the case where the data operation unit 6 obtains a new instruction address by processing a jump instruction or an exceptional processing, this is outputted to the instruction fetch unit 1 and the PC calculation unit 3.

(2.7) "External Bus Interface Unit"

The external bus interface unit 7 controls communication outside the microprocessor of the present invention. All accesses to memories are performed in a clock-synchronized manner, and can be performed in a minimum of two clock cycles.

Access requests to memory are generated independently from the instruction fetch unit 1, the operand address calculation unit 4 and the data operation unit 6. The external bus interface unit 7 arbitrates these memory access requests. Furthermore, access to data located at misaligned words, i.e., memory address which involve crossing over the word boundary of 32 bits (one word) which is the size of the data bus connecting the memory to the CPU is performed in a manner that crossing over the word boundary is automatically detected in this block 7 and the access is decomposed into memory accesses over two steps.

This unit also performs conflict preventing processing and by-pass processing from the store operand to the fetch operand in the case where the operand to be pre-fetched and the operand to be stored are superposed.

(3) "Configuration of data operation unit related to execution of string instruction"

Figure 4:
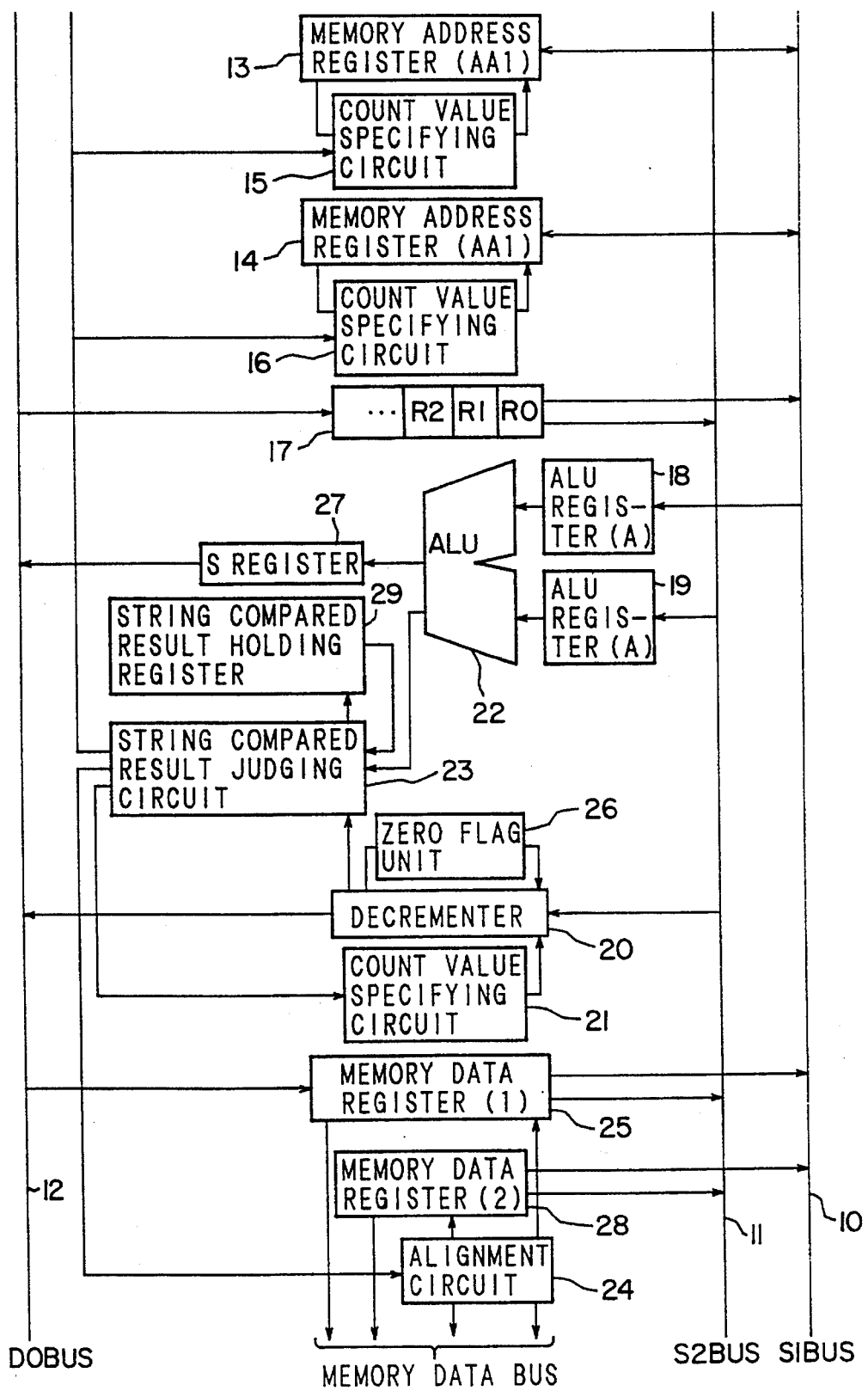
FIG. 4 is a block diagram showing the configuration of the sections required to execute an SMOV instruction, of the data path sections in the data processor of the present invention.

FIG. 4 is a block diagram showing the configuration of the main portion required to execute string instructions in the data processor of the present invention. The configuration will first be explained.

Reference numerals 10, 11 and 12 are 32-bit buses, and called S1 bus, S2 bus and DO bus, respectively.

Numerals 13 and 14 are 32-bit memory address registers to which addresses to be accessed are set at accessing to the external memory, and 13 is called AA1 register and 14 called AA2 register. The input/output of address to/from the both registers are performed through the S1 bus 10. The memory address registers 13 and 14 include count value specifying registers 15 and 16, respectively, whereby the increment and decrement of "1", "2", "3" or "4" can be performed.

Numeral 17 is a register file configured by N number of 32-bit registers ranging from R0 register to R(N-1) register. Each register R0, R1 through R(N-1) includes an input path from the DO bus 12 and an output path to the S1 bus 10 and the S2 bus 11.

An ALU register (A) 18 and an ALU register (B) 19 are 33-bit (32 bits+1 expansion bit) registers, and have an input path from the S1 bus 10 and the S2 bus 11 and an output path to the ALU 22. Both the ALU registers 18 and 19 sign expand or zero expand the input data to 33-bit data according to size and sign.

The ALU 22 executes the addition/subtraction and the logical operation between the data supplied from the ALU register (A) 18 and ALU register (B) 19, and outputs the results to an S register 27. Also, the ALU 22 detects the coincidence/no coincidence of data, and outputs the result to a string compared result judging circuit 23.

Numeral. 20 is a decrementer, which has an input path from the S2 bus 11 and an output path to the DO bus 12 and the ALU 22. The decrementer 20 is a register with 32-bit width, and includes a count value specifying register 21 for decrementing by "1", "2", "3" or "4" at a time and a zero flag unit 26 by which "1" is set when its own value becomes "0".

Numerals 25 and 28 are 32-bit memory registers (1) and (2), respectively, to store the data written into an external memory or the data read from the external memory. Both the registers 25 and 28 include an input path from the DO Bus and an output path to the S1 bus 10 and the S2 bus 11.

Numeral 24 is an alignment circuit for word aligning memory data. An access to the memory is performed always through the alignment circuit 24.

Numeral 23 is a string compared result judging circuit. From the compared result compared by the ALU 22, the value of the decrementer 20 and the value of a string compared result holding register 29, the coincidence/no coincidence of two data or satisfaction of an other comparison condition is detected, whereby whether the execution of a string instruction is to be terminated or not is determined. Also, the string compared result judging circuit 23 sets the value of the count value specifying register 21 for updating the value of the decrementer 20, and the values of the count value specifying registers 15 and 16 For updating the value of the memory address registers 13 and 14. Further, the circuit 23 writes the comparison condition result into the string compared result holding register 29, and outputs the data size of the source data written onto destination side to the alignment circuit 24.

The string compared result holding register 29 receives the comparison condition result between the first source data to be compared at the time of execution of the SCMP instruction and the comparison value from the string compared result judging circuit 23, holds the result, and then outputs again the compared result to the string compared result judging circuit 23 when the first source data is compared with a second source data.

(3.1) "Configuration of ALU"

The data processor of the present invention performs the execution control of instructions by a microprogram control system.

FIG. 5 shows the definition contents of the operations specifiable by each microfield related to the ALU control. First, with reference to FIG. 3, each microfield will be explained.

An SU field specifies the sign expansion/zero expansion of the ALU 22. The ALU 22 performs the sign expansion/zero expansion when fetching the operand into the ALU register (A) 18 or the ALU register (B) 19.

An AOP field defines the operation executed by the ALU 22. The ALU 22 used for the data processor of the present invention has the function of a circuit with logical operation such as logical product (AND) and logical add (OR) in an arithmetic operation circuit based on an adder, and performs the operation of addition, subtraction, AND and OR by being specified by the AOP field.

A DA field and a DB field specify the input control of the ALU register (A) 18 and the ALU register (B) 19, respectively. Specifically, they can perform either of the following processings: the data inputted from the S1 bus 10 or the S2 bus 11 are directly transferred to the ALU 22; the data inputted from the S1 bus 10 or the S2 bus 11 are inverted and transferred to the ALU 22; the ALU register (A) 18 or the ALU register (B) 19 is cleared; and data input is not performed.

A ZA field specifies the size for performing sign/zero expansion by either of a word (32 bits), half word (16 bits) and a byte (8 bits) when the ALU 22 fetches the operand from the S2 bus 10 into the ALU register (A) 18.

A ZB field specifies the size for performing sign/zero expansion by either of a word, half word and a byte when the ALU 22 fetches the operand from the S2 bus 11 into the ALU register (B) 19.

An ADO field specified to what register the operation result executed by the ALU 22 is outputted, or from what register the result is outputted to the DO bus 12. Specifically, it can specify either of the following processings: the operation result is returned to the ALU 22; the contents of the S register 27 are outputted to the DO bus 12; and the output from the ALU 22 to the DO bus 12 is prohibited.

FIG. 6 is a list in which the functions of the ALU 22 used in the data processor of the present invention are defined by the combination of the operations specifiable by each microfield related to the ALU control.

The ALU 22 processes the operation required to allow the function of each instruction by combining each function through the microprogram control.

Figure 7:
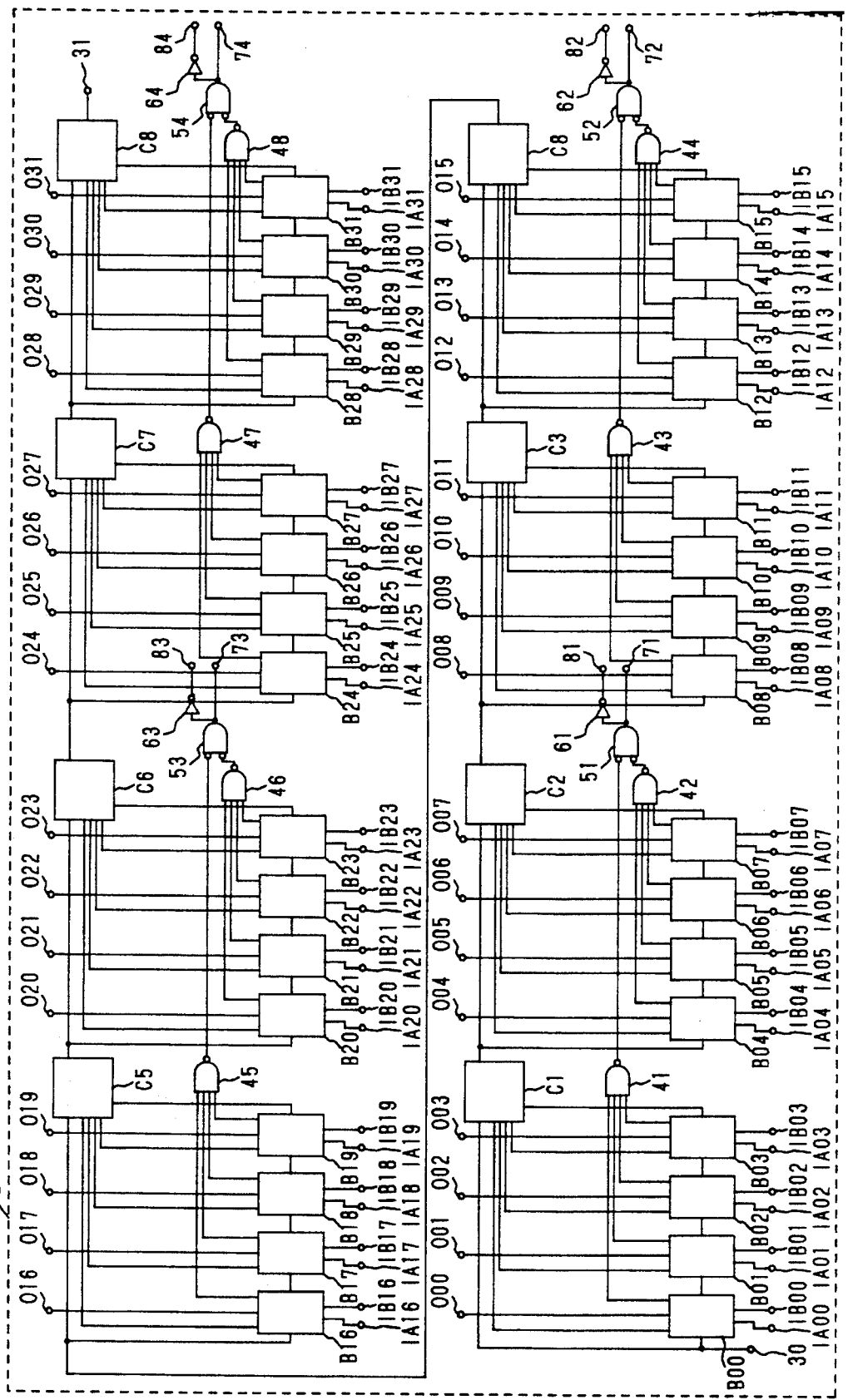
FIG. 7 is a block diagram showing the detailed configuration of the ALU provided in the data processor of the present invention.

FIG. 7 is a block diagram showing the configuration of the ALU 22 provided in the data processor of the present invention.

The ALU 22 provided in the data processor of the present invention has the function of a logical operation circuit for performing AND and OR in an arithmetic operation circuit based on an adder.

In FIG. 7, reference signs B00 to B31 show each single-bit circuit of the ALU 22. Those single-bit circuits B00 to B31 have respective input paths IA00 to IA31 from the ALU register (A) 18, input paths IB00 to IB31 from the ALU register (B) 19, and paths O00 to O31 through which operation result is outputted to the S register 27.

The ALU 22 has an output path 30 through which the value "1" is inputted when performing subtraction, and also an output path 31 for generating a V flag which is set when the operation result overflows or underflows, an L flag which is set when the result becomes negative, and an X flag indicating the carry/take-down of addition/subtraction. Further, the ALU 22 of this embodiment has CLAs (Carry Look Heads) C1 to C4 for each 4 bits to attain a high-speed operation.

The ALU 22 includes NAND gates 41 to 48 for receiving as an input the inverted signal of the value of exclusive logical add of the two inputted data for each one bit, NOR gates 51 to 54 for receiving as an input the output signals of the NAND gates 41 to 48 and inverters 61 to 64 for receiving as an input the output signals of the NOR gates 51 to 54, and has paths through which the outputs 71 to 74 of the NOR gates 51 to 54 and the outputs 81 to 84 of the inverters 61 to 64 are outputted to the string compared result judging circuit 23.

An output signal 71 of the NOR gate 51 being "1" indicates that the data of the first byte become coincident, an output signal 72 of the NOR gate 52 being "1" indicates that the data of the second byte become coincident, an output signal 73 of the NOR gate 53 being "1" indicates that the data of the third byte become coincident, and an output signal 74 of the NOR gate 54 being "1" indicates that the data of the fourth byte become coincident.

An output signal 81 of the inverter 61 being "1" indicates that the data of the first byte become non coincident, an output signal 82 of the inverter 62 being "1" indicates that the data of the second byte become coincident, an output signal 83 of the inverter 63 being "1" indicates that the data of the third byte become non coincident, and an output signal 84 of the inverter 64 being "1" indicates that the data of the fourth byte become non coincident.

(3.2) "String compared result judging circuit"

Figure 8:
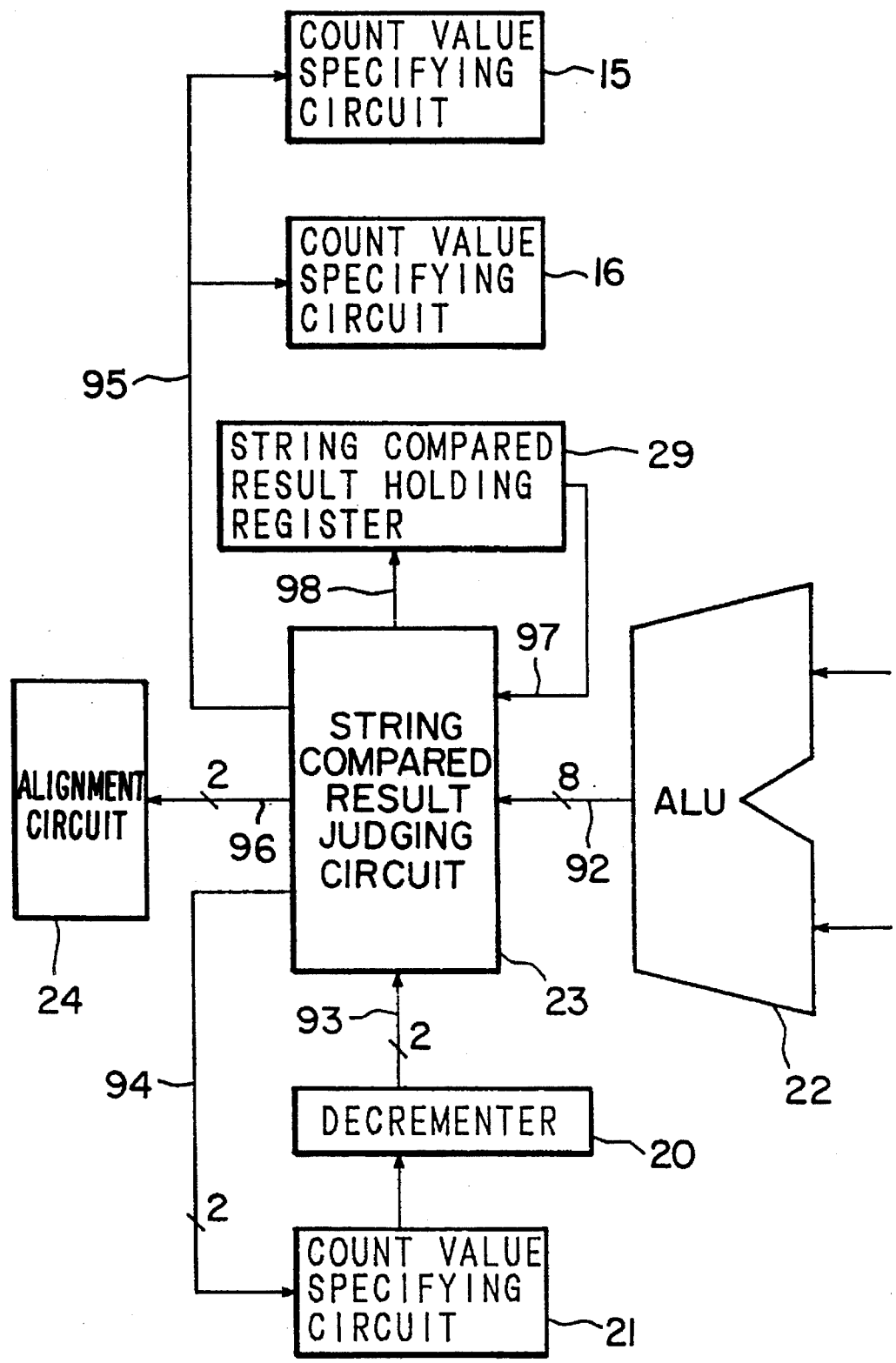
FIG. 8 is a typical view showing the relationship in connection among the ALU, a string compared result judging circuit, a decrementer, a count value specifying register, and an alignment circuit provided in the data processor of the present invention.

FIG. 8 is a block diagram showing the relationship in connection among THE ALU 22, the string compared result judging circuit 23, the count value specifying registers 15, 16 and 21, the alignment circuit 24, the decrementer 20, and the compared result holding register 29.

The ALU 22 compares data for each one bit, and outputs to the string compared result judging circuit 23 an 8-bit signal 92 which consists of the output signals 71 to 74 of the NOR gates 51 to 54 becoming "1" when compared results become coincident, and the output signals 81 to 84 of the inverters 61 to 64 becoming "1" when compared results become none coincident.

The decrementer 20, when the value thereof becomes "4" or less, outputs a 2-bit signal 93 indicating the value to the string compared result judging circuit 23.

The string compared result judging circuit 23 has an input path 97 from the compared result holding register 29.

The string compared result judging circuit 23 has a 2-bit signal 94 for setting the value of the count value specifying register 21 to update the value of the decrementer 20 according to the data size of the comparison value from the compared result of ALU 22 and the value of the decrementer 20, a path 95 for setting the value of the count value specifying registers 15 and 16 to update the value of the address registers 13 and 14, a path 96 for outputting to the the alignment circuit 24 a 2-bit signal indicating the data size of the source data written onto the destination side, and a path 98 for setting the comparison condition result to the compared result holding register 29.

The string compared result judging circuit 23, by performing the logical add operation of the compared results outputted from the ALU 22 for each one bit, performs in parallel the comparison operation of the string data consisting of 8-bit or 16-bit element size, and by performing the logical product, operation of the compared results for each one bit, performs the comparison operation of the string data consisting of 32-bit element size. The 2-bit signals 95 and 94 outputted to the count value specifying registers 15, 16 and 21 by the string compared result judging circuit 23 specify a set of count values "00"=1, "01"=2, "10"=3 and "11"=4, respectively. The 2-bit signal 96 outputted to the alignment circuit 24 specifies a data width 1 byte by "00", 2 bytes by "01", 3 bytes by "10" and 4 bytes by "11", respectively.

Then, the operation of the circuit configuration shown in FIG. 8 will be specifically explained.

The operation of the string compared result judging circuit 23 is classified by the kind and timing of string instruction into the following three operations:

The first operation is performed to determine whether the execution of instruction is terminated or not from either the compared results of the ALU 22 or the value of the decrementer 20 at the time of executing the SMOV instruction, and to set the value of the count value specifying registers 15, 16 and 21 and the data size outputted to the alignment circuit 24.

The second operation is performed to set the compared result to the comparison holding register 29 from only the compared result of the ALU 22 in the cycle in which the First source data are compared with the comparison value at the time of executing the SCMP instruction.

The third operation is performed to determine whether the execution of instruction is terminated or not from the value of the compared result holding register 29, the compared result of the ALU 22, and the value of the decrementer 20 in the cycle in which the first source data are compared with the second source data at the time of executing the SCMP instruction, and to set the value of the count value specifying registers 15, 16 and 21.

The case will first be explained in the case where the string compared result judging circuit 23 determines whether the execution of instruction is terminated or not from the compared result of the ALU 22 and the value of the decrementer 20 at the time of executing the SMOV instruction, and sets the value of the count value specifying registers 15, 16 and 21 and the data size outputted to the alignment circuit 24.

FIGS. 9(a), 9(b) and 9(c) are typical views showing the value set to the count value specifying registers 15, 16 and 21 and the value of the data width outputted to the alignment circuit 24 from the compared result at the ALU 22, and showing the cases where the data size of the comparison value is 8 bits, 16 bits and 32 bits, respectively.

With reference to FIG. 9(a), the case where data size of the comparison value is 8 bits (1 byte) will first be explained.

When the compared results become coincident at a first byte A (0:7) of 32-bit source data A (0:31), each of the values of the count value specifying registers 15, 16 and 21 is set to "1", whereby the value of the data width outputted to the alignment circuit 24 becomes 1 byte. When the compared results become coincident at a second byte A (8:15) of the source data, each of the values of the count value specifying registers 15, 16 and 21 is set to "2", whereby the value of the data width outputted to the alignment circuit 24 becomes 2 bytes. When the compared results become coincident at a third byte A (16:23) of the source data, each of the values of the count value specifying registers 15, 16 and 21 is set to "3", whereby the value of the data width outputted to the alignment circuit 24 becomes 3 bytes. When the compared results become coincident at a fourth byte A (24:31) of the source data, each of the values of the count value specifying registers 15, 16 and 21 is set to "4", whereby the value of the data width outputted to the alignment circuit 24 becomes 4 bytes.

When all the compared results become non coincident at the ALU 22, each of the values of the count value specifying registers 15, 16 and 21 is set to "4", whereby the value of the data width outputted to the alignment circuit 24 becomes 4 bytes.

When the compared results become coincident in the first and second bytes A (0:7) and A (8:15) of the source data, the compared result of the first byte is given priority, and each of the values of the count value specifying registers 15, 16 and 21 is set to "1", whereby the value of the data width outputted to the alignment circuit 24 becomes 1 byte. In that case, the compared result of the source data with a low address is given priority at all times. When the value of the decrementer 20 is smaller than a set value set to the count value specifying register 21, the value of the decrementer 20 becomes the value of the count value specifying registers 15, 16 and 21.

With reference to FIG. 9(b), the case where data size of the comparison value is 2 bytes will be explained.

When the compared results become coincident in the first and second bytes A (0:15) of the source data A (0:31), the value of the count value specifying register 21 is set to "1", and each of the values of the count value specifying registers 15 and 16 is set to "2", whereby the value of the data width outputted to the alignment circuit 24 becomes 2 bytes.

When the compared results become coincident in the third and Fourth bytes A (18:31) of the source data, the value of the count value specifying register 21 is set to "2", and each of the values of the count value specifying registers 15 and 16 is set to "4", whereby the value of the data width outputted to the alignment circuit 24 becomes 4 bytes.

When all the compared results become non coincident at the ALU 22, the value of the count value specifying register 21 is set to "2", and each of the values of the count value specifying registers 15 and 16 is set to "4", whereby the value of the data width outputted to the alignment circuit 24 becomes 4 bytes.

When the compared results become coincident in the First and second bytes A (0:15) and the third and fourth bytes A (16:31) of the source data, the source data with a low address are given priority at all times, the value of the count value specifying register 21 is set to "1", and each of the values of the count value specifying registers 15 and 16 is set to "2", whereby the value of the data width outputted to the alignment circuit 24 becomes 2 bytes.

In the case where the value of the decrementer 20 is "1", even when the compared results become coincident in the third and fourth bytes A (16:31) of the source data, or even when all the compared results become non coincident at the ALU 22, the value of the count value specifying register 21 is compulsorily set to "1", and each of the values of the count value specifying registers 15 and 16 is compulsorily set to "2", whereby the value of the data width outputted to the alignment circuit 24 becomes 2 bytes.

Finally, with reference to FIG. 9(c), the case where data size of the comparison value is 4 bytes will be explained.

In this case, even when the compared results become non coincident, the value of the count value specifying register 21 is set to "1", and each of the values of the count value specifying registers 15 and 16 is set to "4", whereby the value of the data width outputted to the alignment circuit 24 becomes 4 bytes.

FIGS. 10(a), 10(b) and 10(c) are typical views showing the value set to the count value specifying registers 15, 16 and 21 from the compared result at the ALU 22 in the cycle in which the first source data are compared with the comparison value at the time of executing the SCMP instruction, and the value set to the count value specifying registers 15, 16 and 21 from the compared result at the ALU 22, the value of the decrementer 20 and the value of the compared result holding register 29, and showing the cases where the data size of the comparison value is 8 bits, 16 bits and 32 bits, respectively.

With reference to FIG. 10(a), the case where data size of the comparison value is 8 bits (1 byte) will first be explained.

In the cycle in which the first source data A(0:31) is compared with the comparison value, when the compared results become coincident in the first byte A (0:7) of the first source data, the compared result holding register 29 is set to "1"; when the compared results become coincident in the second byte A (8:15) of the first source data, the compared result holding register 29 is set to "2"; when the compared results become coincident in the third byte A (16:23) of the first source data, the compared result holding register 29 is set to "3"; and when the compared results become coincident in the fourth byte A (24:31) of the first source data, the compared result holding register 29 is set to "4".

When the compared results become coincident in the first and second bytes A (0:7) and A (8:15) of the first source data, the compared result of the first, byte is given priority, whereby the value of the compared result holding register 29 is set to "1". In that case, the compared result in the source data with a low address is given priority at all times.

In the cycle in which the first source data is compared with the second source data, when the compared results become non coincident in the first byte A (0:7) of the first source data, each of the values of the count value specifying registers 15, 16 and 21 is set to "1"; when the compared results become non coincident in the second byte A (8:15) of the first source data, each of the values of the count value specifying registers 15, 16 and 21 is set to "2"; when the compared results become non coincident in the third byte A (16:23) of the first source data, each of the values of the count value specifying registers 15, 16 and 21 is set to "3"; and when the compared results become non coincident in the fourth byte A (24:31) of the first source data, each of the values of the count value specifying registers 15, 16 and 21 is set to "4".

In the case where the detection of no coincidence is not performed, each of the values of the count value specifying registers 15, 16 and 21 is set to "4".

When the compared results become coincident in the first and second bytes A (0:7) and A (8:15) of the first source data, the compared result of the first byte is given priority, whereby each of the values of the count value specifying registers 15, 16 and 21 is set to "1". In that case, the compared result in the source data with a low address is given priority at all times. However, in the case where the value set to the count value specifying registers 15, 16 and 21 is larger than either the value of the decrementer 20 or the value of the compared result holding register 29 for holding the compared result between the first source data and the comparison value, the smaller of the value of the decrementer 20 or the value of the compared result holding register 29 for holding the compared result between the first source data and the comparison value is taken as the value of the count value specifying registers 15, 16 and 21.

Then, with reference to FIG. 10(b), the case where data size of the comparison value is 2 bytes will be explained.

In the cycle in which the first source data is compared with the comparison value, when the compared results become coincident in the first and second bytes A (0:15) of the first source data, the compared result holding register 29 is set to "1", and when the compared results become coincident in the third and fourth bytes A (16:31) of the first source data, the compared result holding register 29 is set to "2".

When the compared results become coincident in the first and second bytes A (0:15) and the third and fourth bytes A (16:31) of the first source data, the compared result of the first byte is given priority, whereby the value of the compared result holding register 29 is set to "1". In that case, the compared result in the source data with a low address is given priority at all times.

In the cycle in which the first source data is compared with the second source data, when the compared results become non coincident in the first and second bytes A (0:15) of the first source data, each of the values of the count value specifying registers 15, 16 and 21 is set to "1", and when the compared results become non coincident in the third and fourth bytes A (16:31) of the first source data, each of the values of the count value specifying registers 15, 16 and 21 is set to "2".

In the case where the no coincidence is not detected, each of the values of the count value specifying registers 15, 16 and 21 is set to "2".

When the compared results become non coincident in the first and second bytes A (0:15) and the third and fourth bytes A (16:31) of the first source data, the source data with a low address is given priority at all times, whereby each of the values of the count value specifying registers 15, 16 and 21 is set to "1". However, in the case where the value set to the count value specifying registers 15, 16 and 21 is larger than either the value of the decrementer 20 or the value of the compared result holding register 29 for holding the compared result between the first source data and the comparison value, the smaller of the value of the decrementer 20 or the value of the compared result holding register 29 for holding the compared result between the first source data and the comparison value is taken as the value of the count value specifying registers 15, 16 and 21.

Finally, with reference to FIG. 10(*c*), the case where data size of the comparison value is 4 bytes will be explained.

In the cycle in which the first source data is compared with the comparison value, when the compared results between the first source data and the comparison value become coincident, the compared result holding register 29 is set to "1".

In the cycle in which the first source data is compared with the second source data, when the compared results become non coincident in the first source data A(0:31), each of the values of the count value specifying registers 15, 16 and 21 is set to "1".

(3.3) "Clock signal"

FIG. 11 is a timing chart of clock signals used to control each component shown in the block diagram of FIG. 4.

Signs PHA, PHB, PHC and PHD are non-overlapped four-phase clocks, and the duration From the rise of the clock PHA to the next rise thereof is one cycle.

Each component shown in FIG. 4 is controlled according to those clocks as follows.

The S1 bus 10 and the S2 bus 11 become valid during duration when the clock PHA is "1", and the DO bus 12 valid during duration when the clock PHD is "1". The ALU 22, memory address registers 13 and 14, and count function of the decrementer 20 is configured in a manner to be operated during duration when the clocks PHB and PHC are "1", so that one operation is performed in one cycle. Specifically, during duration when the clock PHA is "1", data are outputted to the S1 bus 10 and the S2 bus 11 and fetched into each arithmetic circuit, and during duration when the clocks PHB and PHC are "1", the operation is performed. The operated result is outputted to the DO bus 12 during duration when the clock PHD is "1", and fetched into the registers.

Access to a memory is performed in one cycle in the case where the memory is operated in no wait. Write of data into and read of data from a memory are performed as follows.

When the read of data from a memory is specified, the data is read from an external memory in one cycle, and can be supplied through the memory data register to the S1 bus 10 or the S2 bus 11 during duration when the clock PHA of the next cycle is "1". In the case where data is written into the memory, by the writing of the data into the memory data register during duration when the clock PHD is "1", the data can be written into the memory in the next cycle.

(4) "Description of SMOV instruction"

Figure 12:
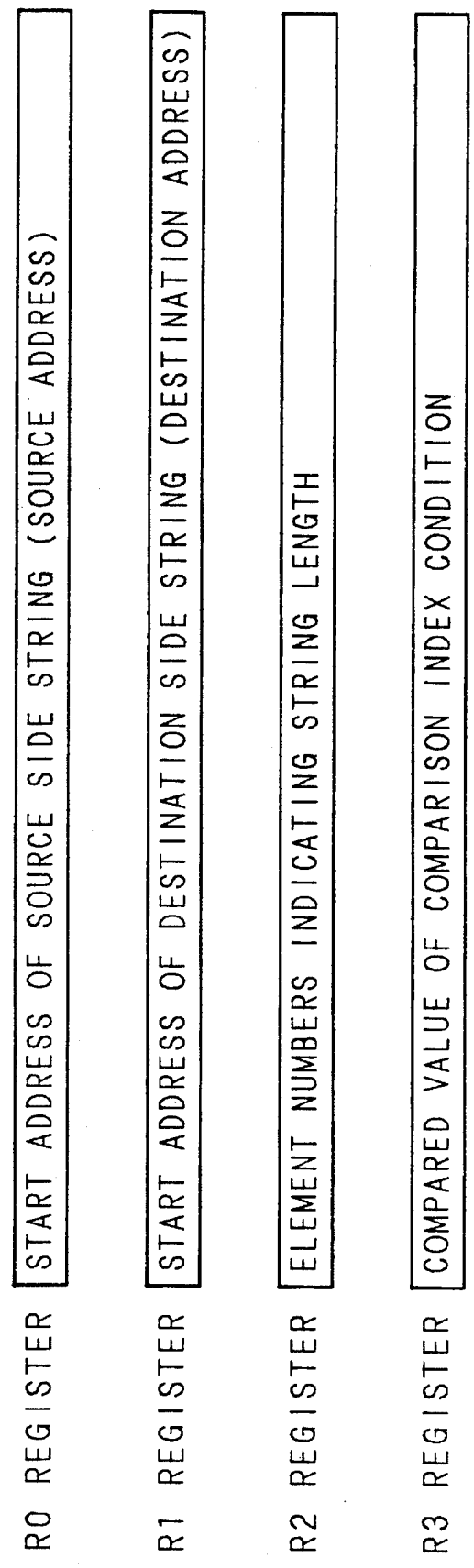
FIG. 12 is a typical view showing the operand of the SMOV instruction.

FIG. 12 is a typical view showing the operand of the SMOV instruction.

The operand of the SMOV instruction is stored in the R0 register, R1 register, R2 register and R3 register in the register file 17. The start address (source address) of the source side string is set to the R0 register; the start address (destination address) on the destination side set to the R1 register; the number of elements representing the string length set to the R2 register; and the comparison value of the comparison index condition set to the R3 register.

FIGS. 13(*a*), 13(*b*) and 13(*c*) are typical views to explain the operation of the R3 register in setting the compared value from the DO bus 12 to the R3 register at the time of executing the SMOV instruction.

As shown in FIG. 13(*a*), in the case where the size of the comparison valued is 1 byte, the data DO (24:31) of the DO bus 12 are set to the R3 (0:7), R3 (8:15), R3 (16:23) and R3 (24:31) of the R3 register.

As shown in FIG. 13(*b*), in the case where the size of the comparison valued is 2 bytes, the data DO (16:31) of the DO bus 12 are set to the R3 (0:15) and R3 (16:31) of the R3 register.

As shown in FIG. 13(*c*), in the case where the size of the comparison valued is 4 bytes, the data DO (0:31) of the DO bus 12 are set to the R3 (0:31) of the R3 register.

FIG. 14 is a typical view to explain the operation of the SMOV instruction.

The SMOV instruction transfers a string. Specifically, the SMOV instruction compares the source data read from the memory with the comparison value of the comparison index condition for the specified index condition and the number of elements, and writes into the designation. Each time one transfer is terminated, the source data is compared with the comparison value stored in the R3 register to check the index condition. In the case where the index condition is established, the instruction is terminated without performing the processing after that point. In the case where the index condition for all elements is not established, the data are transferred by only the number of elements stored in the R2 register.

In the example of the below-mentioned processing of the SMOV instruction, the source data and the destination data to be operated are all limited to the data on the 32-bit (word) alignment boundary. In the case where the data to be operated crosses the 32-bit (word) alignment boundary, the number of accesses to the memory of the bus interface unit 7 increase, so that it is necessary to perform the data shift operation and link operation for the read data and the data to be written so as to align the data. The processing method is described in detail in Japanese Patent Application No. 64-88837 (1989).

(4.1) "Processing of SMOV instructions"

Figure 15:
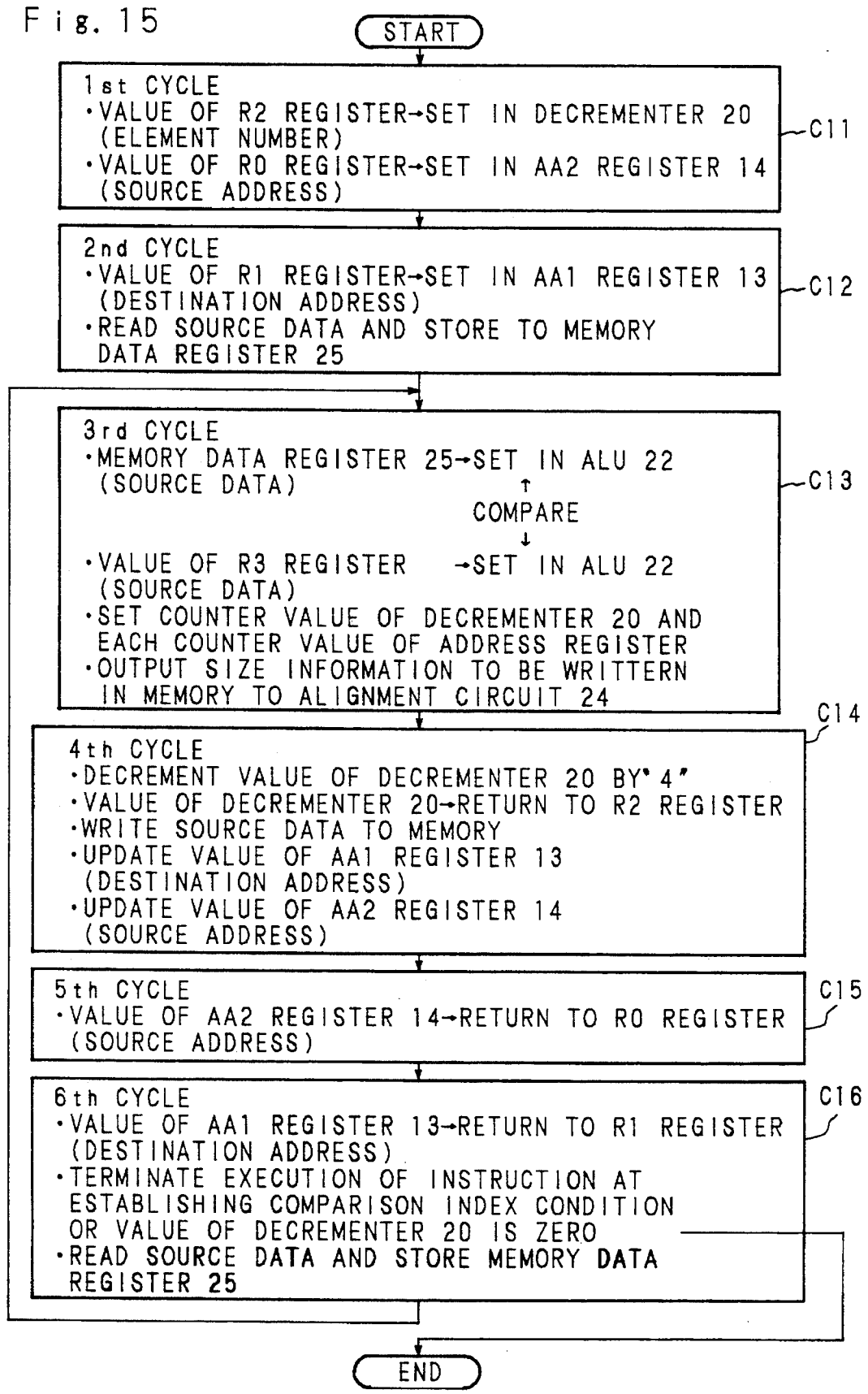
FIG. 15 is a flowchart when the SMOV instruction is processed in the data processor of the present invention.

Then, with reference to the flowchart in FIG. 15, the operation will be explained by which string data of 40 bits (5 bytes) size in which one element consists of 8 bits are processed by the SMOV instruction in the address increasing direction in the data processor of the present invention.

However, the string data to be operated are assumed for only the last element thereof to be the same as the comparison value. The number of elements is assumed to be 10. The address of the source data is taken as "m", and the address of the destination data as "n", which are assumed to be set to the R0 register and R1 register, respectively. The number of elements representing the string length is assumed to be set to the R2 register, and the comparison value of the index condition set to the R3 register. Also, the comparison condition is assumed to be established when the source data is equal to the comparison value.

In a first cycle C11, the contents (number of elements) of the R2 register are set to the decrementer 20, and the contents (source address) of the R0 register are set to the AA2 register (memory address register) 14.

In a second cycle C12, the contents (destination address) of the R1 register are set to the AA1 register (memory address register) 13, and according to the source address stored in the AA2 register 14, the source data are read in word data size from the external memory so as to be stored in the memory data register 25.

In a third cycle C13, the contents (source data) of the memory data register 25 are compared with the contents (comparison value) of the R3 register by the ALU 22. The ALU 22 compares the data in 8-bit units, and outputs the compared result to the string compared result judging circuit 23. In the string data to be operated, only the fifth byte thereof is the same as the comparison value, so that, in the data comparison up to the fourth byte, coincidence is not detected. The string compared result judging circuit 23, from the compared result by the ALU 22 and the value of the decrementer 20, sets the value "4" of the count value specifying register 21 for updating the value of the decrementer 20 in the next cycle, and sets the value "4" of the count value specifying registers 15 and 16 for updating the source address and the destination address, thereby outputting to the alignment circuit 24 the data size information "4" in writing data into the destination.

In a fourth cycle C14, the value of the decrementer 20 is decremented by "4" to make "6", which value is returned to the R2 register. According to the address "m" of the destination stored in the AA1 register 13, the source data are written into the external memory. The values of the AA1 register 13 and the AA2 register 14 are incremented, whereby the values of the source address and the destination address are updated to "n+4" and "m+4", respectively.

In a fifth cycle C15, the value (source address) of the AA2 register 14 is returned to the R0 register.

In a sixth cycle C16, the value (destination address) of the AA1 register 13 is returned to the R1 register. When the comparison index condition has been established in the above-mentioned third cycle, or when the value of the decrementer 20 is zero in the fourth cycle, the execution of instructions is terminated. At this point, the comparison index condition is not established, and the value of the decrementer 20 is "6", so that, according to the address of the source data stored in the AA1 register 14, the data is read from the external memory so as to be stored in the memory data register 25. Then, the operation is returned to the processing of the third cycle C13.

In the second time of the third cycle C13, the contents of the memory data register 25 are compared with those of the R3 register by the ALU 22. The ALU 22 compares the data in 8-bit units, and outputs the compared result to the string compared result judging circuit 23. In the string data to be operated, only the fifth byte thereof is the same as the comparison value, so that, in the first byte compared by the ALU 22, coincidence is detected.

The string compared result, judging circuit 23 detects the establishment of comparison index condition to determine the termination of the execute instruction. The string compared result judging circuit 23, from the compared result by the ALU 22 and the value of the decrementer 20, sets the value "1" of the count value specifying register 21 for updating the value of the decrementer 20 in the next cycle, and sets the value "1" of the count value specifying registers 15 and 16 for updating the source address and the destination address, thereby outputting to the alignment circuit 24 the data size information "1" in writing data into the destination.

In the second time of the fourth cycle C14, the value of the decrementer 20 is decremented by "1" to become "5", the value of which is returned to the R2 register. According to the destination address "m+4" stored in the AA1 register 13, the source data is written into the external memory. Also, the value of the AA1 register 13 and that of the AA2 register 14 are incremented, whereby the value of the source address and that of the destination address are updated to "n+5" and "m+5", respectively.

In the second time of the fifth cycle C15, the value of the AA2 register 14 is returned to the R0 register.

In the second time of the sixth cycle C16, the value of the AA1 register 13 is returned to the R1 register. Since the comparison index condition has been established in the second time of the third cycle C13, the execution of instructions is terminated.

(5) "Description of SCMP instruction"

FIG. 16 is a typical view showing the operand of the SCMP instruction.

The operand of the SCMP instruction is stored in the R0 register, R1 register, R2 register and R3 register in the register file 17. The start address (source address) of the First source side string is set to the R0 register; the start address (source address) of the second source side string is set to the R1 register; the number of elements representing the string length is set to the R2 register; and the comparison value of the comparison index condition is set to the R3 register.

The operation of the R3 register when the comparison value is set from the D0 bus 12 to the R3 register at the time of executing the SCMP instruction is similar, for any of the case where the size of the comparison value is 8 bits, the case where it is 16 bits and the case where it is 32 bits, to that in the case of the SMOV instruction shown in FIG. 13.

The SCMP instruction compares a string. Specifically, the SCMP instruction compares the first source data read from the memory with the comparison value of the comparison index condition for the specified index condition and the number of elements, and checks the index condition. Then, the element on the first source side is compared with that on the second source side, and when the elements become coincident, or the index condition is established, the instruction is terminated without continuing the following processing. When all elements become coincident, and the index condition is not established, only the number of elements stored in the R2 register is transferred.

In the below-mentioned processing of SCMP instruction, as with the above-mentioned SMOV instruction, the first source data and second source data to be operated are all limited to the data on the 32-bit (word) alignment boundary. In the case where the data to be operated crosses the 32-bit (word) alignment boundary, the number of accesses to the memory of the bus interface section 7 increase, so that it is necessary to perform the data shift operation and link operation for the read data so as to align the data. The processing method is described in detail in Japanese Patent Application No. 64-88837 (1989).

(5.1) "Processing of SCMP instruction"

Figure 17A:
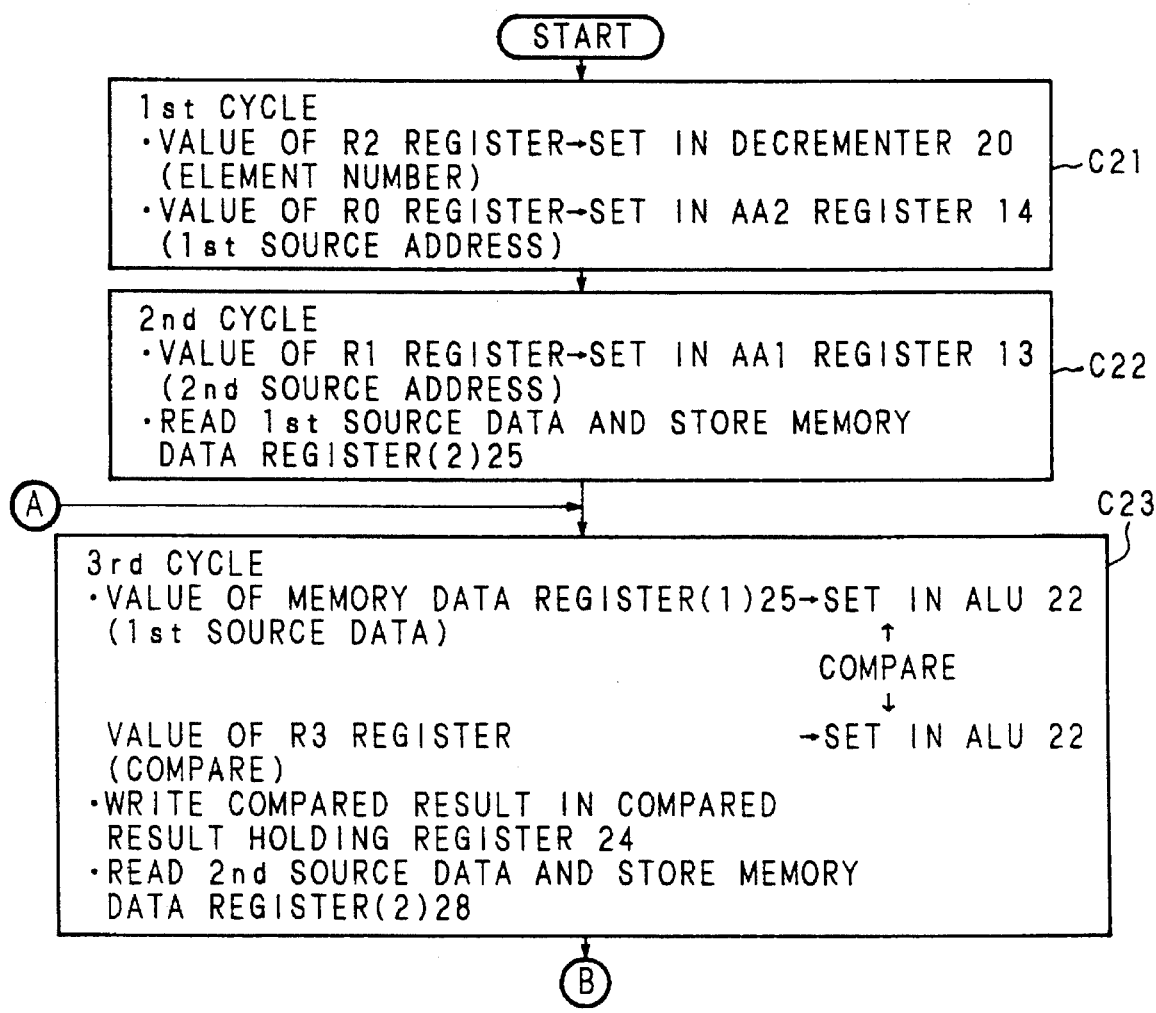
FIGS. 17(a) and 17(b) are a flowchart when the SCMP instruction is processed in the data processor of the present invention.
Figure 17B:
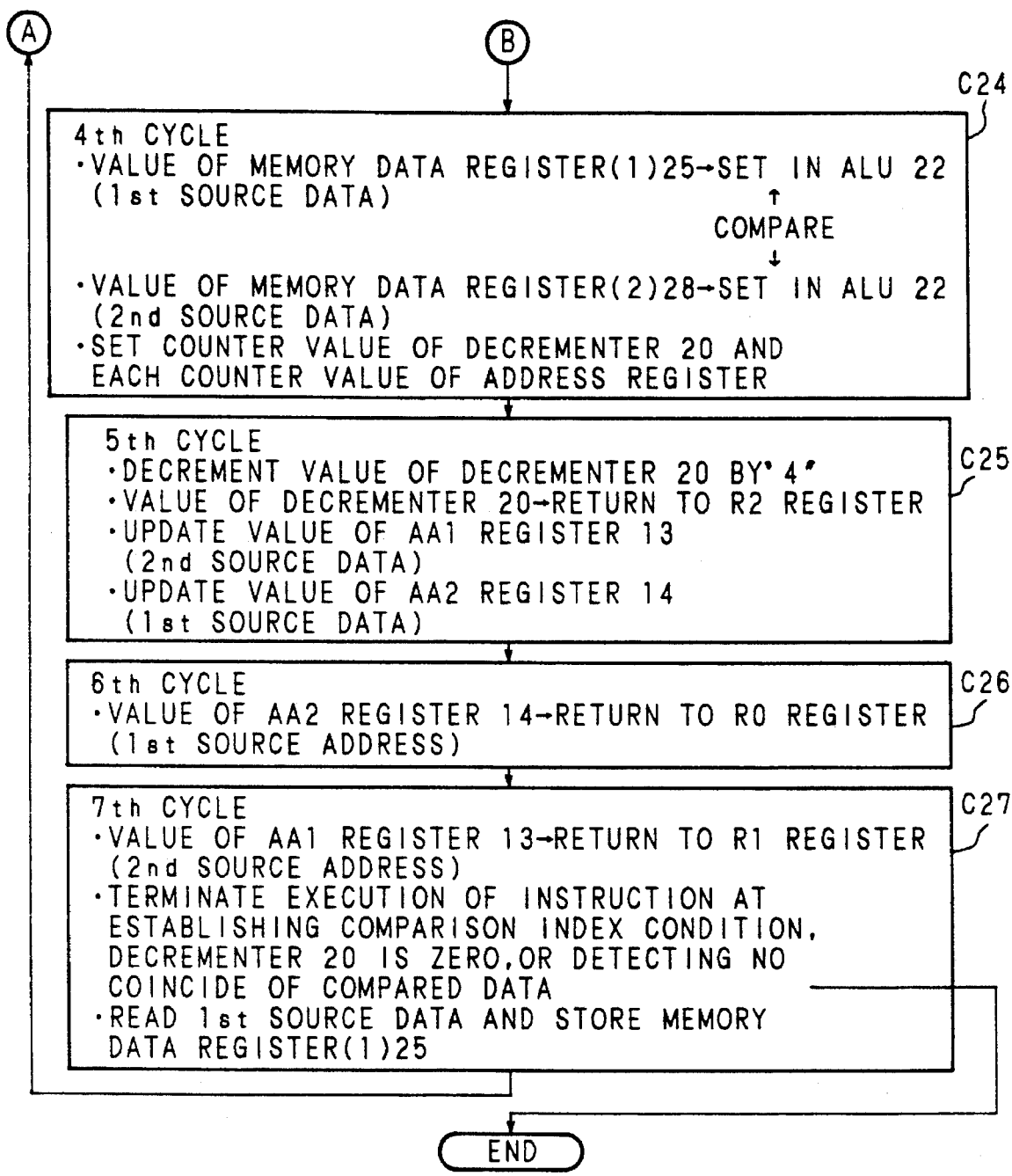

Then, with reference to the flowchart in FIG. 17, the operation will be explained by which the first source string data and the second source string data of 32-bit size in which one element consists of 8 bits are comparison processed by the SCMP instruction in the address increasing direction in the data processor of the present invention.

However, the first source data and the second source data are assumed to be the same data, and the first source data is assumed not to include the same element as the comparison value. The address of the first source data is taken as "K", and that of the second source data as "L", each of which is assumed to be set to the R0 register and the R1 register, respectively. The number of elements "4" representing the string length is assumed to be set to the R2 register, and the comparison value of the comparison condition set to the R3 register. The comparison condition is assumed to be established when the source data is equal to the comparison value.

In a first cycle C21, the contents (number of elements) of the R2 register are set to the decrementer 20, and the contents (first source address) of the R0 register are set to the AA2 register 14.

In a second cycle C22, the contents (second source address) of the R1 register are set to the AA1 register 13, and according to the first source data address "K" stored in the AA2 register 14, the source data are read in word data size from the external memory so as to be stored in the memory data register 25.

In a third cycle C23, the contents (first source data) of the memory data register (1) 25 are compared with the contents (comparison value) of the R3 register by the ALU 22. The ALU 22 compares the data in 8-bit units, and outputs the compared result to the string compared result judging circuit 23. Since the same element as the comparison value is not included in the first source address, the ALU 22 outputs the information indicating that the compared results become non coincident to the string compared result judging circuit 23.

The string compared result judging circuit 23 performs the logical add operation of the 4-bit signals outputted from the ALU 22, detects that compared results become non coincident, and allows the comparison condition result to be held by the compared result holding register 24.

According to the address "L" of the second source data stored in the AA1 register 13, the source data is read in word data size from the external memory to be stored in the memory data register (2) 28.

In a fourth cycle C24, the contents (first source data) of the memory data register (1) 25 are compared with the contents (second source data ) of the memory data register (2) 28 by the ALU 22. The ALU 22 compares the data in 8-bit units, and outputs the compared result to the string compared result judging circuit 23. At this point, the first source data and the second source data are the same data, so that the compared results by the ALU 22 become all coincident, and non coincident element is not detected.

The string compared result judging circuit 23 performs the logical add operation between the compared result by the ALU 22 and the detecting signal detected when the value of the decrementer 20 becomes "4" or less, and based on the result, determines the termination of the execute instruction. The comparison condition result based on the comparison between the first source data held in the compared result holding register 24 in the previous cycle and the comparison result is neglected because any coincident element is not detected. Also, the string compared result judging circuit 23 sets the value "4" of the count value specifying register 21 for updating the value of the decrementer 20 in the next cycle, and the value "4" of the count value specifying registers 15 and 16 for updating the first source address and the second source address.

In a fifth cycle C25, the value of the decrementer 20 is decremented by "4", the value of which is returned to the R2 register. The value of the AA1 register 13 and that of the AA2 register 14 are incremented, whereby the value of the first source address and that of the second source address are updated to "K+4" and "L+4", respectively.

In a sixth cycle C26, the value of the AA2 register 14 is returned to the R0 register.

In a seventh cycle C27, the value of the AA1 register 3 is returned to the R1 register. In this case, the comparison index condition has been established in the above-mentioned third cycle, so that the execution of instructions is terminated.

As mentioned in detail above, in the first invention of the data processor according to the present invention, from the logical add operation and the logical product operation of four compared results detected on, for example, each 8 bits, the comparison operation of the data consisting of 8-bit, 16-bit and 32-bit elements can be performed by the same hardware, whereby four parallel comparison operations of the data consisting of 8-bit element and two parallel comparison operations of the data consisting of 16-bit element become executable with one processing to allow a hardware for processing a high-speed comparison operation.

In the second invention, in performing the transfer operation of the string data consisting of, for example, 8-bit and 16-bit size elements, four- or two-element data transfer can be performed with one processing while performing in parallel the search operation of the last data element of the data to be transferred, thereby allowing a microprocessor for executing at a high speed the instruction to transfer the string data which consist of 8-bit and 16-bit element size and only whose last data element is the same as the comparison value.

In the third invention, in performing the comparison operation of the string data consisting of, for example, 8-bit and 16-bit size elements, from the number of elements to be operated and the compared result, four- or two-element data comparison can be performed in parallel with one processing, thereby allowing a microprocessor for executing at a high speed the instruction to compare string data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A data processor, coupled to an external memory and including an ALU and registers for parallel processing of data words including n, where n is an integer greater than or equal to 2, data elements of fixed size, said data processor for executing string processing instructions that include a size field indicating a specified number, less than or equal to n, of data elements forming a string comparison element equal to either the entire data word or a fraction of the data word, said data processor comprising:

instruction decoding means for decoding instructions;

data input/output means for transferring data between said data processor and said external memory;

first and second address registers for holding first and second addresses, respectively, with said first address defining a first memory area and said second address defining a second memory area in said external memory;

a first register for holding a first data word comprising n first data elements, said first data word fetched through said data input/output means from said first memory area of said external memory specified by said first address held by said first address register;

a second register for holding a comparison data word comprising a variable number of repeated copies of a comparison value, each comparison value comprising said specified number of comparison value data elements, with the product of the variable number and the specified number equal to n so that the second register holds n comparison value data elements;

comparing means included in said ALU and connected with said first and second registers and said instruction decoding means for concurrently performing logic operations on all n pairs of corresponding first data elements held in said first register and comparison value data elements held in said second register so that the full width of the ALU is utilized regardless of whether the specified number is less than n, and said comparing means for outputting, in parallel, n compared results, each compared result being a logical value output by said comparing means indicating as the result of said logic operation whether said first data element and said comparison value data elements satisfy a comparison condition with the comparison condition specifying that the first data element is larger than or equal to the second data elements; and compared result judging means, coupled to said comparing means and said data input/output means, for executing a logical product operation on the compared results of said comparing means resulting from the comparison of the specified number of data elements held in said first register forming a string comparison element and the comparison value data elements held in said second register comprising said comparison value to generate logical products indicating whether said comparison value and said string comparison element satisfy said comparison condition and for executing the logical sum operation on said logical products to determine whether any of the string comparison elements held in said first register and said comparison value satisfy said comparison condition and updates the addresses in said first and second address registers and controls said data input/output means to repeatedly fetch data from said first memory area and store said fetched data in said second memory area until said compared results indicate that a string comparison element and a comparison value satisfy said comparison condition.

2. A data processor, coupled to an external memory and including an ALU and registers for parallel processing of data words including n, where n is an integer greater than or equal to 2, data elements of fixed size, said data processor for executing string processing instructions that include a size field indicating a specified number, less than or equal to n, of data elements forming a string comparison element equal to either the entire data word or a fraction of the data word, said data processor comprising:

instruction decoding means for decoding instructions;

data input/output means for transferring data between said data processor and said external memory;

first and second address registers for holding first and second addresses, respectively, with said first address defining a first memory area and said second address defining a second memory area is said external memory;

a first register for holding a first data word comprising n first data elements, said first data word fetched through said data input/output means from said first memory area of said external memory specified by said first address held by said first address register;

a second register for holding a second data word comprising n second data elements, said second data word fetched through said data input/output means from said second memory area of said external memory specified by said second address held by said second address register;

a third register, coupled to said instruction decoding means, for holding a length value indicating the number of data elements to be processed;

comparing means, connected with said first and second registers and said instruction decoding means, for concurrently performing logical operations on all n pairs of corresponding first and second data elements held in said first and second registers, so that the full width of the comparison means is utilized regardless of whether the specified number is less than n, and for outputting n compared results, each compared result being a logic value output by said comparing means indicating whether a pair of corresponding first and second data elements satisfy a comparisons condition with the comparison condition specifying that the first data element is larger than or equal to the second data elements; and compared result judging means, connected with said instruction decoding means, said comparing means and said third register for performing logical operations on the n compared results resulting from the comparison of specified numbers of data elements held in said first and second registers to determine whether any of said string comparison elements do not satisfy said comparison condition and updates the first and second addresses in said first and second address registers to repeatedly fetch data from said first and second memory areas, perform said logical operations on said compared results, and for decrementing said length value until said compared results indicate that said string comparison elements do not satisfy said comparison condition or said length value is decremented to a predetermined number.

3. A data processor including logic circuits and registers for parallel processing of data words including n, where n is an integer greater than or equal to 2, data elements of fixed size, said data processor for executing string processing instructions that include a size field indicating a specified number, less than n, of data elements forming a string comparison element equal to a fraction of the data word, said data processor comprising:

a first register for holding a first data word comprising n first data elements;

a second register for holding a second data word comprising n second data elements;

a logic circuit, coupled to said first and second register and responsive to said size field, for concurrently performing logical operations on all n pairs of corresponding first and second data elements held in said first and second registers so that the full width of the logic circuit is utilized although the specified number is less than n, and said logic circuit for outputting n compared results, each compared result being a logical value output by said logic circuit indicating whether corresponding first and second data elements satisfy a comparison condition, with the comparison condition specifying that the first data element is larger than or equal to the second data elements; and a judging circuit, coupled to said logic circuit, for concurrently performing a logical operation on all said n compared results to indicate whether any of said string comparison elements comprising the specified number of elements and stored in said first and second registers satisfy the comparison condition.

* * * * *